(12) United States Patent
Kulkarni et al.

(10) Patent No.: US 9,501,946 B1
(45) Date of Patent: Nov. 22, 2016

(54) SYSTEMS AND METHODS FOR STABLE HAPTIC FEEDBACK OVER PACKET-SWITCHED NETWORKS

(71) Applicants: Parikshit Sudhir Kulkarni, Tampa, FL (US); Susana Karina Lai-Yuen, Tampa, FL (US)

(72) Inventors: Parikshit Sudhir Kulkarni, Tampa, FL (US); Susana Karina Lai-Yuen, Tampa, FL (US)

(73) Assignee: University of South Florida, Tampa, FL (US)

( * ) Notice: Subject to any disclaimer, the term of this patent is extended or adjusted under 35 U.S.C. 154(b) by 1 day.

(21) Appl. No.: 14/571,377

(22) Filed: Dec. 16, 2014

Related U.S. Application Data

(60) Provisional application No. 61/916,946, filed on Dec. 17, 2013.

(51) Int. Cl.
*G08B 6/00* (2006.01)
*G09B 9/00* (2006.01)
*H04L 29/06* (2006.01)

(52) U.S. Cl.
CPC . *G09B 9/00* (2013.01); *G08B 6/00* (2013.01); *H04L 29/06034* (2013.01)

(58) Field of Classification Search
CPC .......... G08B 6/00; G08B 1/045; G09B 9/00; G09B 9/048; G09B 9/063; G06F 17/5022; G06F 17/5009; G06T 13/20; G06T 19/00
USPC ...... 340/407.1, 7.6; 345/156, 157, 419, 420, 345/473; 463/30, 31, 38
See application file for complete search history.

(56) References Cited

U.S. PATENT DOCUMENTS

| | | | |
|---|---|---|---|
| 5,062,123 A | 10/1991 | Geile | |
| 5,956,484 A | 9/1999 | Rosenberg et al. | |
| 6,161,126 A | 12/2000 | Wies | |
| 7,084,867 B1 * | 8/2006 | Ho | G06F 3/016 345/419 |
| 7,245,202 B2 | 7/2007 | Levin | |
| 8,072,422 B2 | 12/2011 | Rosenberg et al. | |
| 8,359,114 B2 | 1/2013 | Steingart et al. | |
| 2007/0275359 A1 | 11/2007 | Rotnes et al. | |

(Continued)

FOREIGN PATENT DOCUMENTS

| | | |
|---|---|---|
| WO | WO2011095537 | 8/2011 |
| WO | WO2013040424 | 3/2013 |

OTHER PUBLICATIONS

Guo, et al., Real-Time Meshless Deformation, Comp. Anim Virtual Worlds, 2005; 16: 189-200.

(Continued)

*Primary Examiner* — Hung T Nguyen
(74) *Attorney, Agent, or Firm* — Thomas | Horstemeyer, LLP

(57) ABSTRACT

Providing haptic feedback to a user over a packet-switched network includes sensing movement of a haptic device by a user, the haptic device being configured to control a first virtual object within a virtual environment, transmitting data associated with the movement of the haptic device from a client computer to a remote server via the packet-switched network, the server modeling movement of the first virtual object in the virtual environment and estimating an orientation and a position of the first virtual object within the virtual environment, the server determining a type of tactile feedback to be provided to the user, the server transmitting the type of tactile feedback data to the client computer via the packet-switched network, and providing tactile feedback to the user with the haptic device.

20 Claims, 7 Drawing Sheets

(56) References Cited

U.S. PATENT DOCUMENTS

| | | | |
|---|---|---|---|
| 2008/0278484 | A1 | 11/2008 | Payandeh et al. |
| 2009/0295552 | A1* | 12/2009 | Shahoian .............. G06F 3/016 340/407.1 |
| 2012/0029947 | A1 | 2/2012 | Wooldridge et al. |
| 2012/0151339 | A1 | 6/2012 | Zhang et al. |
| 2013/0016042 | A1 | 1/2013 | Makinen et al. |
| 2013/0085774 | A1 | 4/2013 | Chen et al. |
| 2013/0187930 | A1 | 7/2013 | Millman |
| 2014/0267076 | A1* | 9/2014 | Birnbaum ............. B25J 13/025 345/173 |

OTHER PUBLICATIONS

Guo, et al., Point-based Dynamic Deformation and Crack Propagation, 2004.

Anderson, et al., Bilateral Control of Teleoperators with Time Delay; IEEE transactions and automatic control, vol. 34, No. 5, May 1989.

Basdogan, et al., An experimental study on the role of touch in shared virtual environments, ACM Trans. Comput. Human Interactions, vol. 7, No. 4, pp. 443-460, Dec. 2000.

Bate, et al., Reducing wave-based teleoperator reflections for unknown environments, IEEE transactions on industrial Electronics, vol. 58. No. 2, Feb. 2011.

Chopra, et al., Bilateral teleoperation over unreliable communication networks; IEEE transactions on control systems technology, vol. 16, No. 2, Mar. 2008.

Cook, et al., Internet-based learning in the health professions; Clinican's Corner, AMA, vol. 300, No. 10, Sep. 10, 2008.

Dev, et al., Simulated Medical Learning Environments on the Internet; Journal of American Medical Information Association, vol. 9, No. 5, Sep./Oct. 2002.

P. Dev., Trends in Health care education: Research Opportunities in Teaching and Learning; Stanford University School of Medicine, 2004.

Gunn, et al., Combating Latency in Haptic Collaborative Virtual Environments, Presence, vol. 14, No. 3, Jun. 2005.

Hikichi, et al., The Evaluation of Delay Jitter for Haptics Collaboration over the Internet; IEEE, 2002.

Kalman, et al., A new approach to linear filtering and prediction problems; Transaction of the ASME; Journal of Basic Engineering, pp. 35-45, Mar. 1960.

Iglesias, et al., Assembly simulation on simulation on collaborative haptic virtual environments; in Proc. 15th Int. Conf. Central Eur. Comput, Graphics Comput. Vis., pp. 241-248, 2007.

Lancaster, et al., Surfaces generated by moving least squares methods; Mathematics of Compulation, 87, 1981, pp. 141-158, Jul. 1981.

Pauly, et al., Meshless animation of fracturing solids; International Conference on Computer Graphics and Interactive Techniques, Los Angeles, CA, 2005, pp. 957-964.

Park, et al., Effects of network characteristics on human performance in collaborative virtual environment virtual reality; in Proc. IEEE Virtual Reality, 1999, pp. 104-111.

DeJong, et al., Lessons learned from a novel teleoperation testbed; Industrial Robot: An International Journal, vol. 33, No. 3, pp. 187-193, 2006.

Occupational Safety, Safety and Health in Forest Operations-Approved Code of Practice. Occupational Safety and Health Service, 1998.

Cheung, et al., Adaptive force reflecting teleoperation with local intelligence; Industrial Robot: An International Journal, vol. 34, No. 3, pp. 201-210, 2007.

Gu, et al., Adaptive Passive control with Varying time Delay; Si9mulation modeling practice and Theory, vo. 18, No. 1, pp. 1-8, 2010.

Hirabayashi, et al., Teleoperation of construction machines with haptic information for underwater applications; Automation in Construction, No. 15, pp. 563-571, 2006.

Hokayem, et al., Bilateral teleoperation: An historical survey, Automatica. No. 42, pp. 2035-2057, 2006.

Niemeyer, et al., Stable Adaptive Teleoperation; IEEE Journal of Oceanic Engineering, vol. 16, No. 1, pp. 152-162, Jan. 1991.

Zhu, et al., Moving to the Centre: A gaze-driven remote camera control for teleoperation; Interacting with Computers, vol. 23, pp. 85-95, Jan. 2011.

Hua, et al., Convergence analysis of teleoperation systems with unsymmetric time-varying delays; Circuit and Systems II: Express Briefs, IEEE Transactions on, vol. 56, No. 3, pp. 240-244, Mar. 2009.

* cited by examiner

SYSTEMS AND METHODS FOR STABLE HAPTIC FEEDBACK OVER PACKET-SWITCHED NETWORKS

CROSS-REFERENCE TO RELATED APPLICATION

This application claims priority to U.S. Provisional Application Ser. No. 61/916,946, filed Dec. 17, 2013, which is hereby incorporated by reference herein in its entirety.

BACKGROUND

Haptic-based medical simulations are increasingly being used to train medical personnel on human anatomy and surgical procedures. Unfortunately, most commercial products that enable such simulation are expensive and therefore out of reach for many institutions, such as universities and hospitals. As a result, a wide population of medical students and practitioners do not benefit from the technology. It would be desirable to provide haptic-based medical simulation at a lower cost so that more students and practitioners could benefit from it.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to provide relatively low-cost haptic-based medical simulation so as to benefit more medical students and practitioners. Disclosed herein are systems and methods that facilitate haptic-based simulation over packet-switched networks, such as the Internet. In some embodiments, the systems and methods use a cloud-based streaming platform that integrates the sense of touch along with visual and audio feedback in online applications. The platform provides users with the ability to see, hear, touch, and interact with virtual objects in the cloud in real time. The platform can be utilized in various applications, including medical/surgical simulation, military simulation, cloud gaming, product marketing, and engineering design. The framework can leverage algorithms for the mathematical modeling of deformable objects, stochastic control systems, and compression techniques to enable stable and transparent haptic feedback over packet-switched networks. In some embodiments, the platform comprises a client-server architecture with low latency communication of visual, audio, and haptic data. This enables computationally intensive tasks to be performed on cloud-based servers while requiring minimal computation on the client side. With such a scheme, highly realistic simulations can be deployed on low-cost client devices having less computing power.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
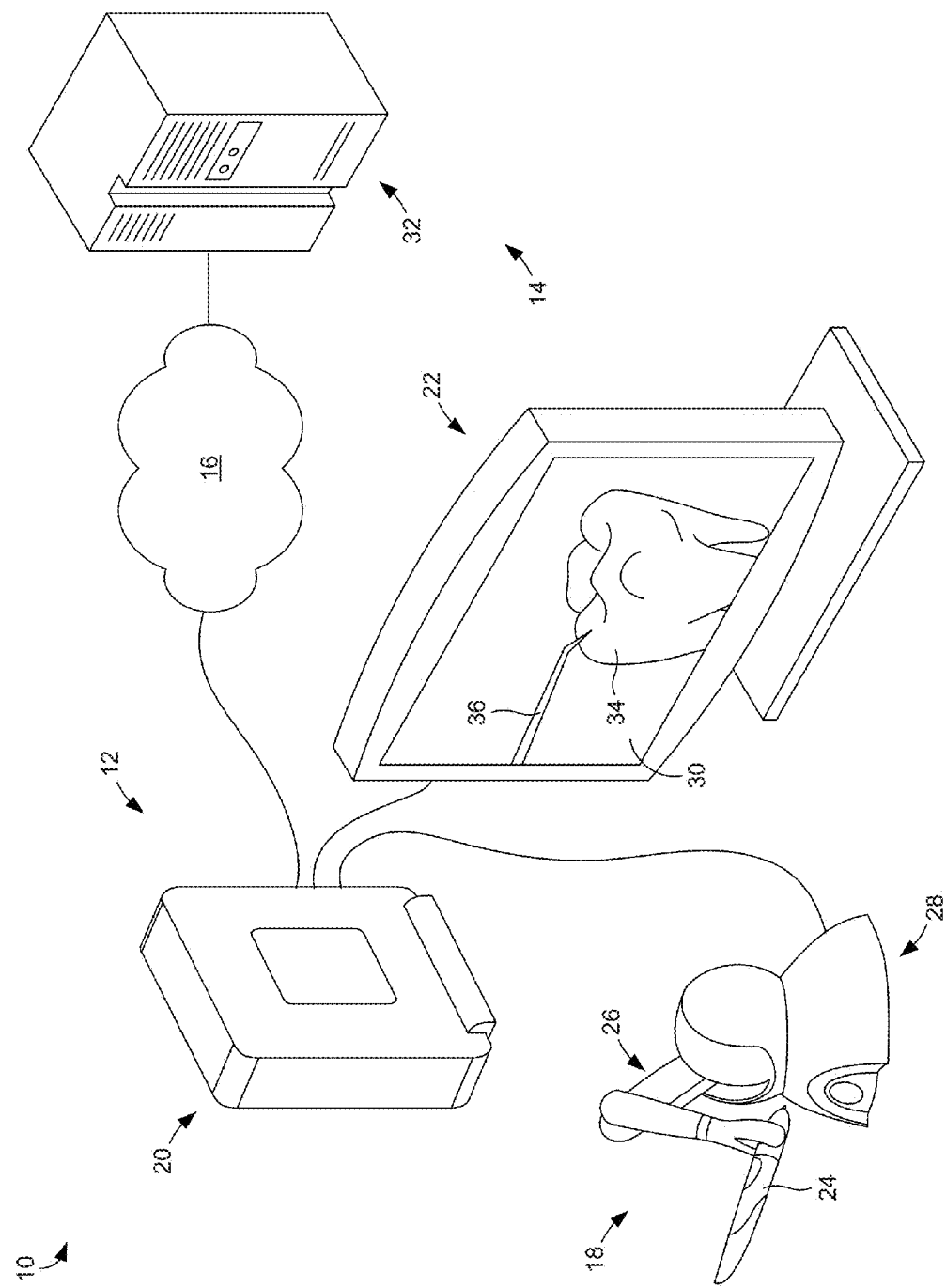
FIG. 1 is a schematic diagram of an embodiment of a system for providing stable haptic feedback over a packet-switched network.

Described herein is a cloud-based streaming platform (system) that integrates the sense of touch along with visual and audio feedback in online applications to provide users with the ability to see, hear, touch, and interact with virtual objects in the cloud in real time. FIG. 1 illustrates an example embodiment of the system, which can be used to enable anytime, anywhere access to realistic simulation tools. The design shown in this figure enables performance of computationally intensive tasks in the cloud, thus enabling users to leverage low-cost, off-the-shelf hardware. Algorithms used in the system are application agnostic and can therefore be tailored for use in various settings.

As shown in FIG. 1, the system 10 generally comprises a client side 12 and a server side 14 that are joined by a packet-switched network 16, which can comprise the Internet. The client side 12 comprises various components that facilitate use of the system 10, including a haptic device 18, a client computer 20, and a display device 22.

The haptic device 18 comprises a device that a user can operate to control a virtual object within a virtual environment. When the virtual objects interact with other virtual objects within the virtual environment, vibrations, forces, or motions can be communicated to the user with the haptic device 18 to provide realistic tactile feedback to the user. In the example of FIG. 1, the haptic device 18 includes a stylus 24 that the user can grip that represents a virtual object, such as a tool, that is represented in the virtual environment. The stylus 24 is connected to and supported by an armature 26, which extends from a base 28. The base 28 can comprise motors, vibration mechanisms, or other components that generate the tactile feedback and transmit it to the stylus 24 via the armature 26.

The haptic device 18 is in electrical communication with the client computer 20, which can receive input data from the haptic device and transmit tactile feedback data to the haptic device. In some embodiments, the client computer 20 comprises a thin client (or "terminal computer") that has limited computational and/or storage capacity and therefore is designed to be used with a more powerful computer, such as a remote server computer to which it is connected. Because of its limited computational/storage capacity, the client computer 20 is both less expensive to manufacture and purchase.

The display device 22 is also in electrical communication with the client computer 20. As shown in FIG. 1, the display device 22 includes a display screen 30 on which image data, such as images and/or video of the virtual environment, can be displayed to the user.

On the server side 14 of the system 10 is a server computer 32 that has much greater computational and storage capacity than the client computer 20. Although only a single server computer 32 is shown in FIG. 1, it is to be appreciated that the functionality of the server side 14 of the system 10 can be provided by multiple server computers. In some embodiments, the functionality of the server side 14 is provided by a high performance cluster of computers.

During operation of the system 10, the server computer 32 creates a virtual environment with which the user interacts. Image and/or video data is generated by the server computer 32 that is transmitted to the client computer 20 in real time via the packet-switched network 16 for display on the display device 22. In the example of FIG. 1, the virtual environment includes a virtual tooth 34 with which the user can interact by controlling a virtual dental instrument 36 to facilitate a simulation of a dental procedure. The displayed instrument 36 can be referred to as the "cursor" of the system 10. The user exercises this control by manipulating the stylus 24. When the stylus 24 is moved, the speed and direction of this movement are sensed by the haptic device 18, which transmits it to the client computer 20 as user inputs. These user inputs are transmitted to the server computer 32 via the packet-switched network 16.

Once the user inputs are received, the server computer 32 determines what tactile feedback, if any, to provide to the user. For example, if the virtual environment is the environment illustrated in FIG. 1, the server computer 32 determines whether or not the user input results in interaction between the virtual dental instrument and the virtual tooth. If so, the server computer 32 determines the type of tactile feedback to be provided to the user. In addition, the server computer 32 determines what type of visual and audio feedback that should be provided to the user. The server computer 32 then transmits data regarding this feedback to the client computer 20, which then causes the visual, audio, and/or tactile feedback to be provided to the user with the display device 22 and the haptic device 18. Operation continues in this manner for each input the user makes with the haptic device 18 in real time.

Although a dentistry application is illustrated in FIG. 1 and has been described above, it is noted that this is merely an example application and that many other applications are possible. It is further noted that, while particular components have been identified for the client side 12 of the system 10, other components can be used. In some embodiments, the client computer 20 can comprise a mobile client, such as a notebook (laptop) computer, instead of a thin client. In other embodiments, the client side 14 can comprise a device that integrates one or more aspects and/or functions of one or more of the haptic device 18, client computer 20, and display device 22. By way of example, such a device can comprise a mobile client such as a tablet computer or smart phone that has computing, display, and haptic feedback capabilities. Accordingly, the disclosed systems are not limited to the configuration shown in FIG. 1.

Figure 2:
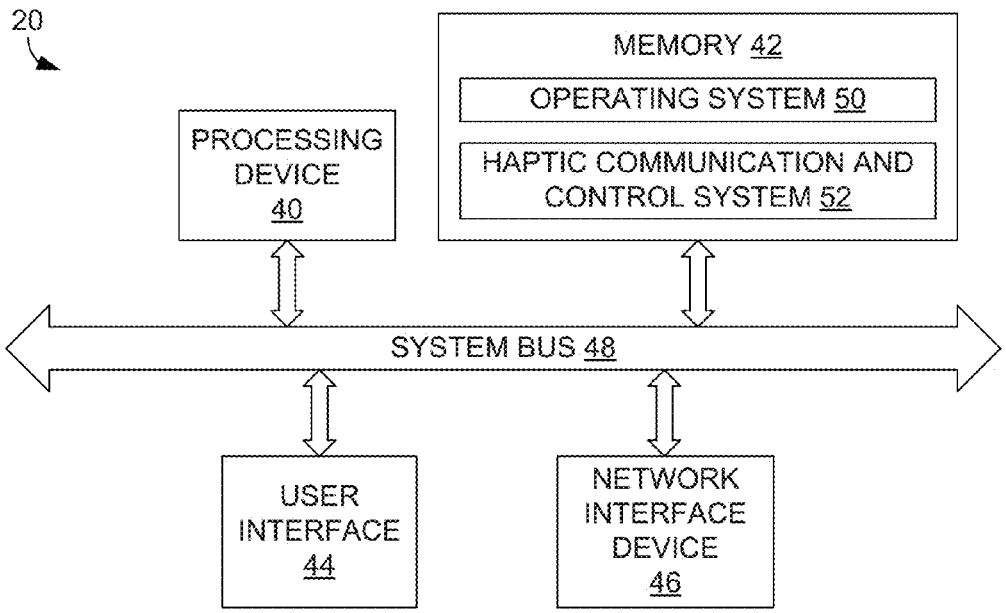
FIG. 2 is a block diagram of an embodiment of a client computer shown in FIG. 1.
Figure 3:
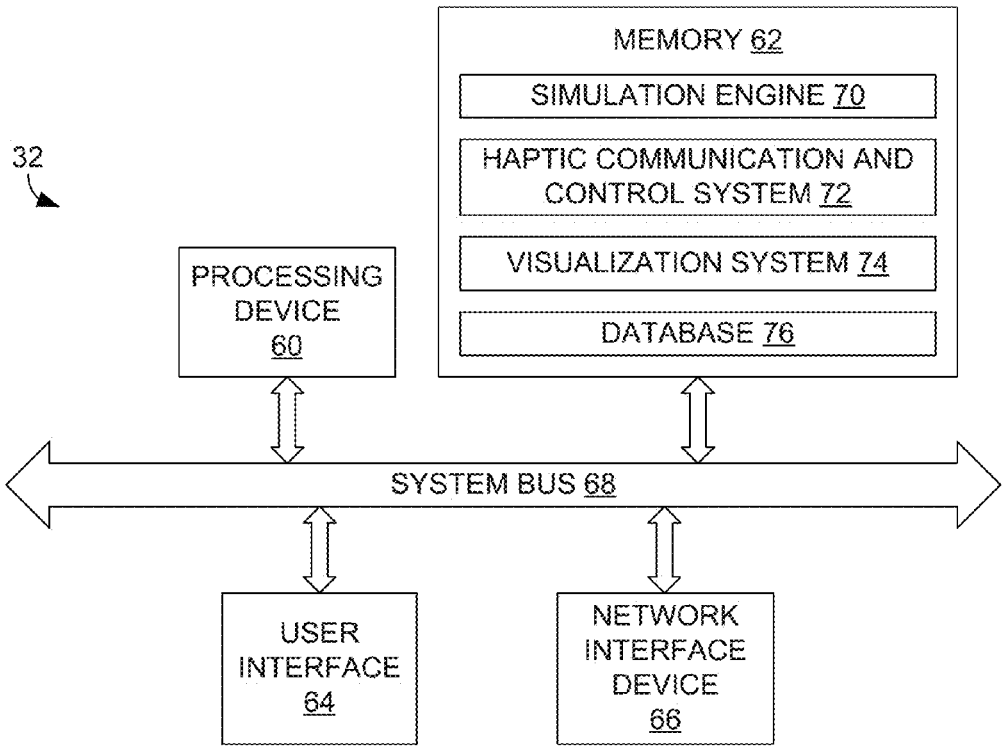
FIG. 3 is a block diagram of an embodiment of a server computer shown in FIG. 1.

FIGS. 2 and 3 illustrate example configurations for the client computer 20 and the server computer 32, respectively. Beginning with FIG. 2, the client computer 20 comprises a processing device 40, memory 42, a user interface 44, and a network interface device 46, each of which is connected to a system bus 48.

The processing device 40 can, for example, include a central processing unit (CPU) that is capable of executing instructions stored within the memory 42. The memory 42 includes any one of or a combination of volatile memory elements (e.g., RAM) and nonvolatile memory elements (e.g., hard disk, ROM, etc.).

The user interface 44 comprises one or more devices that can be used to enter user inputs into the computer 20. The user interface 44 can comprise the haptic device 18 and the display device 22 (FIG. 1), as well a keyboard, mouse, and speakers (not shown). The network interface device 46 comprises a component that enables the computer 20 to communicate with other devices over the packet-switched network 16 (FIG. 1).

The memory 42 (a non-transitory computer-readable medium) stores programs (i.e., logic) including an operating system 50 and client-side haptic communication and control system application layer 52. The operating system 50 controls the general operation of the computer 20, while the haptic communication and control system application layer 52, along with an application layer provided on the server computer 32, enables the haptic feedback described above. Operation of the haptic communication and control system application layer 52 is described in greater detail below.

Although it possesses greater computational and storage capacity, the server computer 32 has a general configuration that is similar to that of the client computer 20. As shown in FIG. 3, the server computer 32 comprises a processing device 60, memory 62, a user interface 64, and a network interface device 66, each of which is connected to a system bus 68.

The processing device 60 can, for example, include a central processing unit (CPU) that is capable of executing instructions stored within the memory 62. The memory 62 includes any one of or a combination of volatile memory elements (e.g., RAM) and nonvolatile memory elements (e.g., hard disk, ROM, etc.).

The user interface 66 comprises one or more devices that can be used to enter user inputs into the computer 32, such as keyboard, mouse, and display device. The network interface device 66 comprises a component that enables the computer 32 to communicate with other devices over the packet-switched network 16 (FIG. 1).

The memory 62 (a non-transitory computer-readable medium) stores programs (i.e., logic) including a simulation engine 70 that simulates the virtual environment, a server-side haptic communication and control system application layer 72 that enables the haptic feedback described above, and a visualization system 74 that renders three-dimensional images and/or video data representing the virtual environment. Each of these programs comprises algorithms whose functionality is described in greater detail below. The memory 62 further comprises a database 76 that stores three-dimensional models of virtual objects presented within the virtual environment.

As can be appreciated from above discussion, the system 10 utilizes three high-level components, including a simulation engine, a haptic communication and control system, and a visualization system, in enabling a user to interact with virtual objects within the virtual environment. Each of these components is separately described in the discussions that follow.

Simulation Engine

Figure 4A:
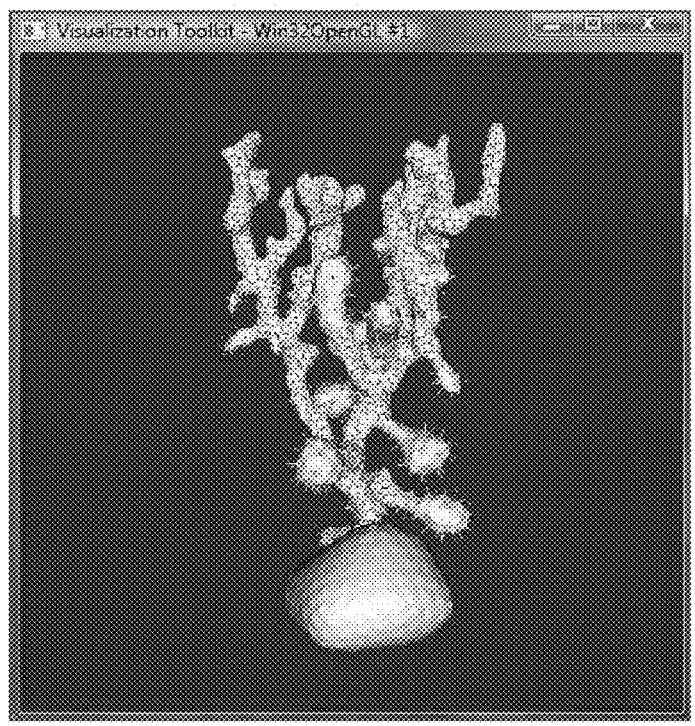
FIG. 4A is a screenshot showing a rendering of three-dimensional model.
Figure 4B:
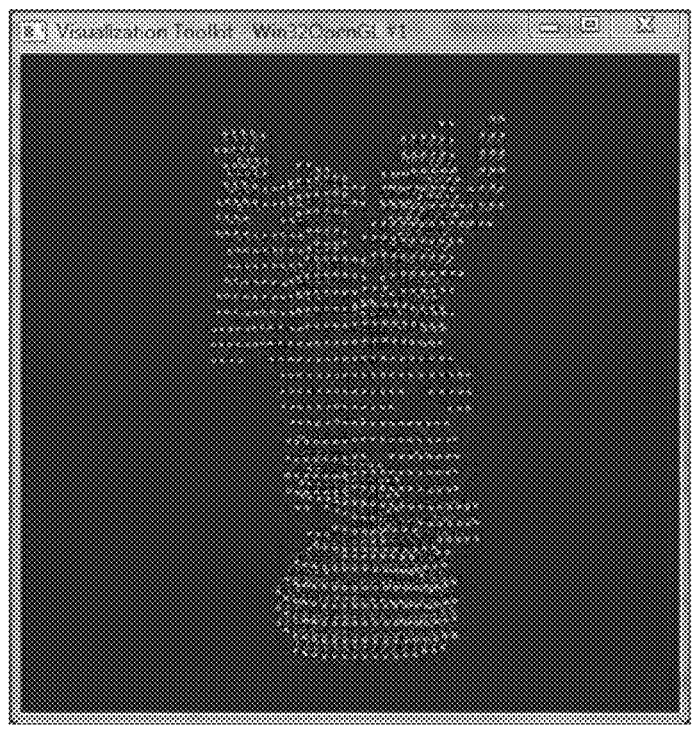
FIG. 4B is a screenshot of a mesh-free representation of the three-dimensional model shown in FIG. 4A.

Three-dimensional anatomical models for dental or surgical simulation can be represented using a mesh-free approach. These models are used for visualization and for computing haptic forces experienced by the user during the simulation. A three-dimensional model can be transformed into a set of nodes. With reference to FIG. 4A, which shows a model of an organ, given the three-dimensional boundary surface S of the model, the volume V bounded by S can be discretized to obtain the set of simulation nodes $\{x_i\}$, as shown in FIG. 4B. A balanced octree hierarchy can be used to provide a higher node density near to the boundary surface and fewer nodes in the interior of the object. Each node $x_i$ can be assigned a support radius $h_i$ and a fixed mass $m_i=4/3\pi h_i^3 \rho$ where $\rho$ is the material density.

For a three-dimensional solid with material coordinates x, the positions of the deformed model in world coordinates are defined as x+u, where $u=(u, v, w)^T$ is a displacement vector field. The shape functions can be calculated using the moving least squares approximation based on the location of the nodes. For a complete polynomial basis $p(x)=[1 x \ldots x^n]^T$ of order n and weight function $\omega_i$, the mesh-free shape functions can be derived as:

$$\phi_i(x)=\omega_i(x,x_i)p^T(x)[M(x)]^{-1}p(x_i) \quad \text{[Equation 1]}$$

where $[M(x)]^{-1}$ is the inverse of the moment matrix defined as:

$$M[x]=\Sigma_i \omega_i(x,x_i)p(x_i)p^T(x_i) \quad \text{[Equation 2]}$$

The deformation caused by u creates strain, which can be determined from the gradient $\nabla u$ using the quadratic Green-Saint-Venan strain tensor as:

$$\epsilon=(\nabla u + \nabla u^T + \nabla u \nabla u^T)/2 \quad \text{[Equation 3]}$$

Based on Hook's Law, the elastic stress $\sigma$ is related to the strain $\epsilon$ as $\sigma=C\epsilon$, where C is a rank four tensor representing the material. The elastic force can then be determined as $f=-\sigma \nabla \epsilon$. This is the force experienced by the user for a given deformation of the model. The gradient $\nabla u_i = [\nabla u_i \nabla v \nabla w_i]$ at the nodes $x_i$ can be calculated as follows:

$$\nabla u_i = [A(x_i)]^{-1} \Sigma_j \omega_i(x_i,x_j)(u_j-u_i)(x_j-x_i) \quad \text{[Equation 4]}$$

where $A(x_i)=\Sigma j(x_j-x_i)(x_j-x_i)^T \omega_i(x_i,x_j)$ is also applicable for calculating $\nabla v_i$ and $\nabla w_i$. The linear basis $p=[1 x]^T$ can be used to obtain a first order approximation. The surface of the model can then be modeled using a point-based representation to facilitate visualization of the model's deformations and to compute the forces generated by such deformations.

Haptic Communication and Control System

As described above, the design of the cloud-based infrastructure can comprise a haptic device running on a thin client that interacts with virtual models stored on a remote server in the cloud. The server can be a high performance cluster of computers that are distant from the client. While this enables users to leverage high-performance computing anywhere on demand, the communication channel inherently introduces a lag in the system. Given that most haptic systems typically require a refresh rate of 1 kHz for ideal operation, a control mechanism is necessary to maintain stable and transparent feedback in real time. The haptic communication and control system is designed to address this issue.

The client used in the framework can be designed to interface with most commercially available haptic devices and to implement a protocol for communicating with the server. In such a case, the client is designed to capture information on the location of the haptic device within its workspace and to set the force computed on the server as feedback to the user. Systems that communicate haptic data over the network are sometimes referred to as "telehaptic" systems. In some embodiments, the client interacts with the haptic device at the prescribed 1 kHz refresh rate while a separate thread in the application uses a user datagram protocol (UDP) for exchanging data with the server at a preset interval. The client can also use a TCP/IP based communication port for exchanging critical messages with the server that typically occur during the hand-shake phase.

UDP is a good choice for the transport layer of the application because haptic applications are extremely sensitive to latency and jitter, which can significantly affect performance of a telehaptic system. The application layer on both ends of the communication channel is responsible for handling out of order, duplicate, and missing packets as they arise during operation. A monotonically increasing time stamp separately generated by the client and server can be used for sorting packets as they are received by the applications. Given the small amounts of data exchanged by the haptic sub-system, the bandwidth requirements for real-time feedback are fairly low. By way of example, an embodiment of the haptic communication system requires a bandwidth of approximately 48 kbps.

Figure 5:
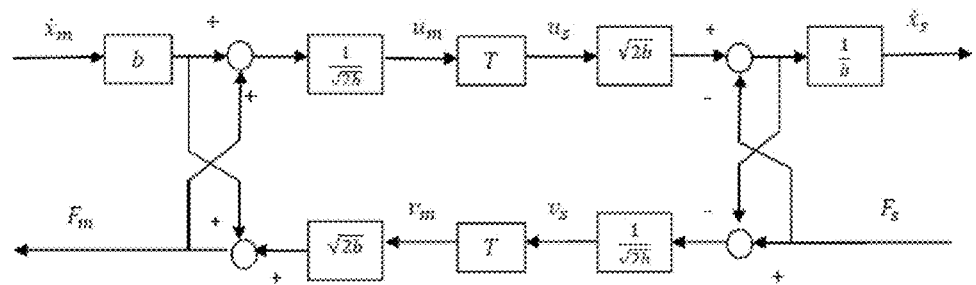
FIG. 5 is a schematic diagram of a first embodiment of a teleoperator that can be used to transfer data over a packet-switched network.

In the past, telerobotic systems have been used to perform diverse tasks in remote locations, such as handling of nuclear waste, controlling deep ocean research vehicles, as well as unmanned space exploration. Such systems typically include a master manipulator (master) controlled by a user that commands a remote salve robot (slave). The slave interacts with its environment and communicates sensed forces to the master. In the context of simulation, the master is represented by the haptic device whereas the slave is the cursor within the virtual environment. FIG. 5 schematically illustrates a teleoperator that can be used in such a system.

The control equations for the system with a constant time delay T can be described as $$u_m(t) = \frac{2b * \dot{x}_m(t) - \sqrt{2b} * v_m(t)}{\sqrt{2b}} \quad \text{[Equation 5]}$$

$$v_s(t) = \frac{\sqrt{2b} * u_s(t) - 2 * F_s(t)}{\sqrt{2b}} \quad \text{[Equation 6]}$$

where $\dot{X}$ is the velocity, F is the force and b is the impedance (>0) for the communication network at time t. Additionally, $$u_s(t)=u_m(t-T) \& \quad \text{[Equation 7]}$$

$$v_m(t)=v_s(t-T) \quad \text{[Equation 8]}$$

The subscripts m and s designate the master and slave, respectively.

The teleoperator scheme depicted in FIG. 5 provides good performance at steady state when the master and slave are following each other closely. However, it may perform poorly when there are transients in the system because of the waves that are reflected at each junction. It is possible to suppress the reflections by a careful matching of the impedance b, but such a system is not easily scalable because it requires a tuning phase each time the remote environment changes.

Figure 6:
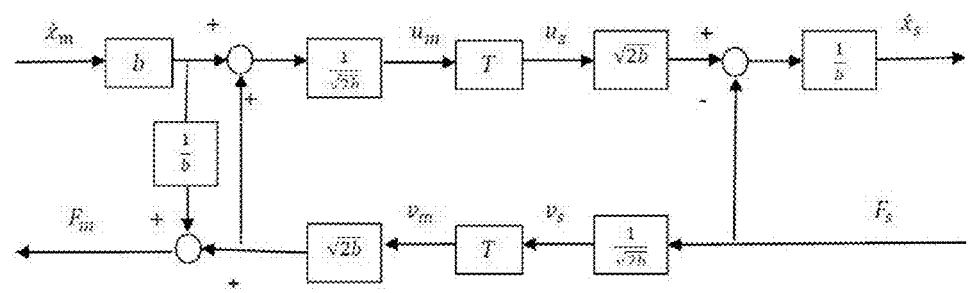
FIG. 6 is a schematic diagram of a second embodiment of a teleoperator that can be used to transfer data over a packet-switched network.

A modified version of the teleoperator shown in FIG. 5 can be used to address this problem. In particular, the teleoperator shown in FIG. 6 can be used, which automatically suppresses reflections. The governing equations to describe this system are:

$$u_m(t) = \frac{b * \dot{x}_m(t) + F_s(t-T)}{\sqrt{2b}} \quad \text{[Equation 9]}$$

$$v_s(t) = \frac{F_s(t)}{\sqrt{2b}} \quad \text{[Equation 10]}$$

The equations for $u_s$ and $v_m$ remain unaltered. After solving for $\dot{x}_s$ and $F_m$, the decoding equations are expressed as:

$$\dot{x}_s(t) = \dot{x}_m(t-T) + \frac{F_s(t-2T)}{b} - \frac{F_s(t)}{b} \quad \text{[Equation 11]}$$

$$F_m(t) = \dot{x}_m(t) + F_s(t-T) \quad \text{[Equation 12]}$$

From these equations, it is apparent that reflecting waves are significantly reduced when the slave and master are following each other closely. Because attenuation of waves is not an overriding concern, the impedance factor does not have to be matched closely for each environment. This makes the architecture fairly generic and resistant to temporal changes in the operating environment.

A further problem that may need to be addressed for the case of a simulator is the fact that transients can be introduced into the system at the moment when the slave first makes contact with the surroundings and the reflected force goes from zero to a non-zero value. This can be seen from Equation 11, where the decoded velocity on the slave is corrupted by such a transition. To address this problem, an impedance factor b can be selected that provides a suitable damping effect. It is easy to configure this factor based on the haptic device used in a given setup because the maximum force that can be rendered by a haptic device is published by the manufacturer and this information can be used for computing the necessary impedance factor. The stability of the aforementioned setup can be proven by computing the norm of its scattering matrix. Using a Laplace transform, the hybrid matrix and the scattering matrix for this two port teleoperator can be described as follows.

$$\begin{bmatrix} F_m(s) \\ -\dot{x}(s) \end{bmatrix} = H(s) \begin{bmatrix} \dot{x}_m(s) \\ F_s(s) \end{bmatrix} \quad \text{[Equation 13]}$$

Using Equations 11 and 12, the hybrid matrix H(s) and the scattering matrix S(s) can be computed as $$H(s) = \begin{bmatrix} 1 & e^{-sT} \\ -e^{-sT} & \frac{1-e^{-2sT}}{b} \end{bmatrix} \text{ and } S(s) = \quad \text{[Equation 14]}$$

$$\begin{bmatrix} 1 & 0 \\ 0 & -1 \end{bmatrix} [H(s) - I][H(s) + I]^{-1}$$

The norm of the scattering matrix can be computed to be less than or equal to 1 for suitable values of p (>0) and within reasonable delay T (up to 10 sec). This condition proves stability of the teleoperator's design.

Equations 9 to 12 describe a stable teleoperator setup that operates in the continuous time domain with a constant time delay T. However, a cloud-based system connects the master and slave through the Internet, which is a packet-switched network. As a result, the communication channel operates in discrete time and the best-effort nature of the Internet makes it inherently unreliable. Additional corrective measures may therefore be necessary to ensure stable operation. The following paragraphs enumerate the design challenges and describe mechanisms that address these issues.

The Internet is a best-effort network that tries to deliver user packets from end to end with the available infrastructure. As a result, certain packets can experience unforeseen delays while others can be lost before reaching their destination. Various network protocols have been designed to work with these characteristics and they provide different tradeoffs based on the needs of the application. The framework described herein uses a UDP transport layer because it helps reduce the maximum latency for each packet at the expense of providing unreliable service. Thus, there is no guarantee that any packet sent by the client will be delivered to the server or vice-versa.

Based on the above, it is apparent that each packet sent by the client or the server experiences time-varying delays during transmission. Additionally, the randomized delay could be increasing or decreasing at any given instant. It is also likely that certain packets are duplicated while others are lost during transmission. To deal with such idiosyncrasies, the framework implements a discrete time control algorithm that runs on both the server and the client. The sampling rate for both the client and server are synchronized and assumed to be $T_s$. A fixed-size packet buffer is also added to the communication block on both ends of the channel. This buffer is used to sort packets based on their time stamp and to discard duplicate packets. It is also leveraged to implement an interpolation mechanism to ensure passivity when packets are lost.

Figure 7:
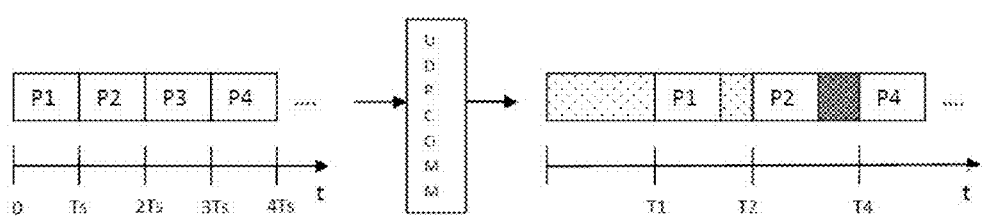
FIG. 7 is a schematic diagram that illustrates delays experienced by packets being transferred over a packet-switched network.

FIG. 7 shows an example of delays experienced by individual packets when transmitted over the Internet using the UDP protocol. In this figure, T1, T2, and T4 denote the times when packets P1, P2, and P4 are received by the remote server, respectively. Packet P3 is lost during transmission. From the figure, it is apparent that each packet experiences time-varying delays during transit. In general, the control mechanism must be robust enough to handle lost packets as well as increasing and decreasing time delays. A reduction in the communication delay does not have an adverse impact on the control scheme as long as there is data available for the sampling loop. On the other hand, lost samples as well as increasing communication delays can destabilize the system and need additional control elements.

The mechanism used by the framework to compensate for lost packets is easy to implement and does not add significant overhead on the communication block. In one embodiment, it uses a monotonically increasing sum of the wave variables coming out from the scattering operation. The summed value along with a time stamp is sent over the network. Thus, at any given instant, the modified wave variable communicated through the network is of the form $u_m = \sum_{i=0}^{t} u_i$.

A complementary block referred to as the subtractor is used on the other side of the channel to subtract last received value from the currently received wave variable. This difference provides the current state. The time stamp that was added to each message is then used to determine if any packets were lost during communication. This is because the time delta between the last and current message should be a multiple of the sample time $T_s$. If the multiple, $\hat{t}$ is >1, then it is known that message(s) have been lost. During such an event, additional samples are injected into the system by another block referred to as the interpolator. The interpolator injects $\hat{t}$ samples into the buffer, each with a value of $\hat{u}=\tilde{u}/\hat{t}$ where $\tilde{u}$ is the current value of the wave variable less the previously received value. When no messages are lost during communication, the interpolator block passes the current value of the wave variable without any modifications.

The next stage of the system is a buffering mechanism that compresses extra messages and stretches signals when necessary. This is achieved by applying an exponential smoothing filter to the wave signal so that shape and trend of the signal are maintained. Thus, at any given sampling instance, the control block is provided with a fresh sample if available or the latest value computed by the smoothing filter. The smoothed value at time t is computed as $$s_t = \alpha * u_{t-1} + (1-\alpha) * s_{t-1} \text{ where } 0<\alpha<1 \quad [\text{Equation 15}]$$

The framework described above is passive and no new energy is added by the blocks responsible for packet recovery and jitter handling. The value of α is chosen based on the desired responsiveness for simulation. The framework implements the modified teleoperator along with aforementioned mechanisms to provide a passive communication channel. However, a passive communication channel does not guarantee acceptable behavior for haptic systems interacting with virtual objects. Described below are problems encountered when dealing with such setups and methods that can be used to address these issues.

The communication framework described above can be used for working with remotely located robots interacting with their physical environment. However, these systems are not sufficient when working with virtual objects located on a remote server. This is because there is a natural tendency to deform a virtual object further because of a lack of immediate force feedback induced by communication delays. When forces are eventually rendered on the client, the user experiences these as sudden spikes. Any reaction to the spikes leads to oscillatory behavior and destabilizes the system. To address this issue, the haptic feedback and control system models user movements in the virtual environment as a stochastic process so that the position of the cursor can be estimated using recursive Bayesian filtering techniques. While the cursor is not in contact with the model, the position is predicted based on current trajectory and information about the latest round trip time between client and server. The location of the cursor is determined with an optimal j-step look-ahead Kalman predictor, where j is computed as T RTT/2*$T_s$·$T_{RTT}$·$T_{RTT}$ in this case is the approximate round trip time for a packet to travel between the client and the server, $T_s$ is the sampling interval and $\lfloor \cdot \rfloor$ denotes the floor operation. A lower value of j can be used for high sampling rates since it inherently improves stability of the haptic feedback at the expense of bandwidth requirements. After a collision has been registered between the cursor and the model, optimal smoothing is performed using the Kalman filter without prediction. The control mechanism is in effect a tracking algorithm that determines the pose of a virtual cursor (position and orientation) so that the reflected force does not induce oscillatory behavior.

In general, a Kalman filter is governed by the following linear stochastic difference equation on the state variable $x_k$ and the corresponding measurement equation $y_k$:

$$x_k = A * x_{k-1} + B * u_{k-1} + w_{k-1} \quad [\text{Equation 16}]$$

$$y_k = C * x_k + z_k \quad [\text{Equation 17}]$$

The random variables $w_{k-1}$ and $z_k$ represent the process and measurement noise, respectively. They are assumed to be independent of each other with the following normal probability distributions: $p(w) \sim N(0,Q)$ and $p(v) \sim N(0,R)$. The process noise covariance (Q) and the measurement noise covariance (R) can be empirically chosen based on observed values during a calibration phase. Alternatively, a moving window that analyzes recently received packets can be used to determine the parameters dynamically. The model used to estimate cursor position is based on equations of motion and the state variable $x_k$ is a vector describing the position and velocity at a given sampling instance. Given a sampling time of $T_s$, the following equations can be used to determine the velocity and position for the cursor.

$$v_{k+1} = v_k + T_s * u_k \tilde{v}_k \quad [\text{Equation 18}]$$

$$p_{k+1} = p_k + T_s * v_k 1/2 * T_s^2 * u_k + \tilde{p}_k \quad [\text{Equation 19}]$$

The variables $\tilde{v}_k$ and $\tilde{p}_k$ denote white Gaussian noise in the recorded position and velocity, while $u_k$ denotes the rate of change of velocity. The state vector $x_k$ can now be defined to contain both the position and velocity terms as $x_k = [p_k v_k^T]$. Finally, the linear system of equations is given as:

$$x_{k+1} = \begin{bmatrix} 1 & T_s \\ 0 & 1 \end{bmatrix} * x_k + \begin{bmatrix} \frac{T_s^2}{2} \\ T_s \end{bmatrix} * u_k + w_k \quad [\text{Equation 20}]$$

$$y_k = [1 0] * x_k + z_k \quad [\text{Equation 21}]$$

To solve the j-step prediction problem, the normal recursive Bayesian estimation method of first solving the 1-step look ahead problem followed by the j-step prediction can be used. The state vector for the 1-step prediction can now be described as $$\hat{x}_{k+1|k} = A * x_{k|k-1} + B * u_k + K_k * (y_k - C \hat{x}_{k|k-1}) \quad [\text{Equation 22}]$$

where A, B, and C can be obtained from equations 16, 17, 20, and 21 by substitution. $\hat{x}_{k+1|k}$ is the estimate of the state vector given states of the vector up to the $k^{th}$ iteration. $K_k$ is the Kalman gain computed as $$K_k = A P_{k|k-1} C^T (C P_{k|k-1} C^T + S_z)^{-1}$$

$P_{k|k-1}$ is the error covariance matrix at the $k^{th}$ iteration based on values up to k−1 and $S_z$ is the measurement noise covariance which is an estimate computed as $E(z_k z_k^T)$. Finally, the error covariance matrix is computed as $$P_{k+1|k} = A P_{k|k-1} A^T + S_w - A P_{k|k-1} C^T (C P_{k|k-1} C^T + S_z)^{-1} C P_{k|k-1} A^T \quad [\text{Equation 23}]$$

$S_w$ is the process noise covariance and is an estimate computed as $E(W_k W_k^T)$.

The j-step ahead predictor can now be computed by iterating j (j>1) times as $$\hat{x}_{k+j|k} = A^j \hat{x}_{k|k} + \sum_{l=0}^{j-1} A^{j-1-l} B u_{k+1} \quad [\text{Equation 24}]$$

The Kalman predictor described above is used to compensate for the delays induced by the communication block. The client side compensates for the delay by holding the last sample of the force until the next sample arrives. The methodology described above ensures that holding the last sample does not increase energy in the system and maintains passivity. Alternatively, an optimal smoothing Kalman filter can also be implemented to compensate for force variations due to communication delays.

Visualization System

Visualizing the virtual model with which a user is interacting is an integral part of any haptic simulation system. A cloud-based simulation engine also needs to address this problem to provide the necessary feedback. Past attempts at enabling network based haptics relied upon locally rendering the models and synchronizing the object pose and orientation with a central server. While this architecture can provide real-time visualization, it is not truly cloud-based because a significant portion of the work is performed on the local client. Additionally, it is necessary to have a copy of the virtual model on the client at the time of the simulation. As the size of the virtual model increases, computational requirements from the client also increase. It also presents significant challenges for synchronizing states of the client and server at all times. The disclosed systems address these problems by rendering the graphical scene in the cloud and streaming compressed video images to the client which are rendered after decompression.

The visualization architecture used by the system enables end users to leverage cloud-based graphics hardware for rendering three-dimensional scenes. End users are therefore not required to update their hardware on a regular basis and the size of the model does not have any impact on system performance. Utilizing thin or possibly mobile clients for all haptic enabled applications is a major advantage of the disclosed architecture. The design also enables the usage of protocols like multicast so that the simulation server can broadcast to multiple clients simultaneously. A current prototype that has been developed leverages the H.264 video compression format for low-latency transmission of visual information in real time.

Example Method

Figure 8A:
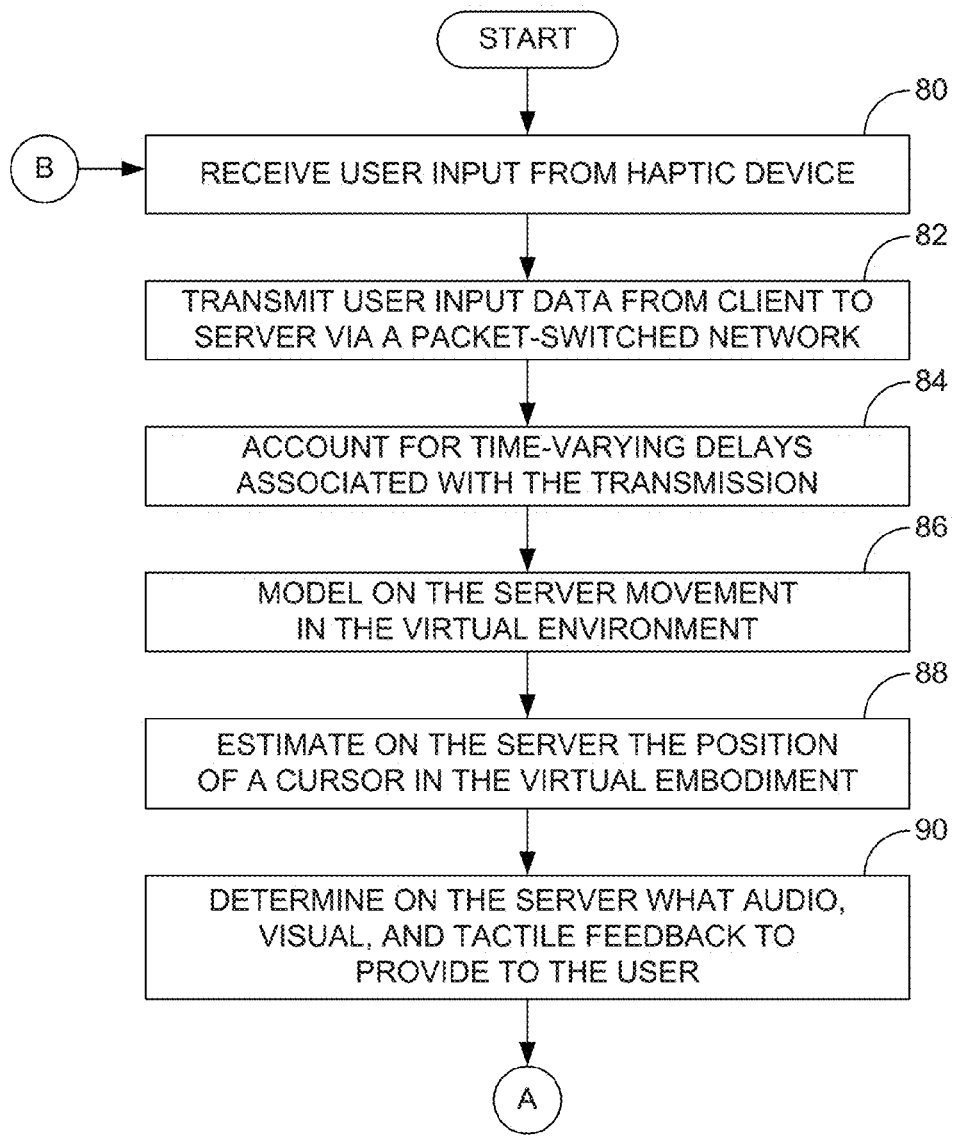
FIGS. 8A and 8B together comprise a flow diagram of an embodiment of a method for providing stable haptic feedback over a packet-switched network.
Figure 8B:
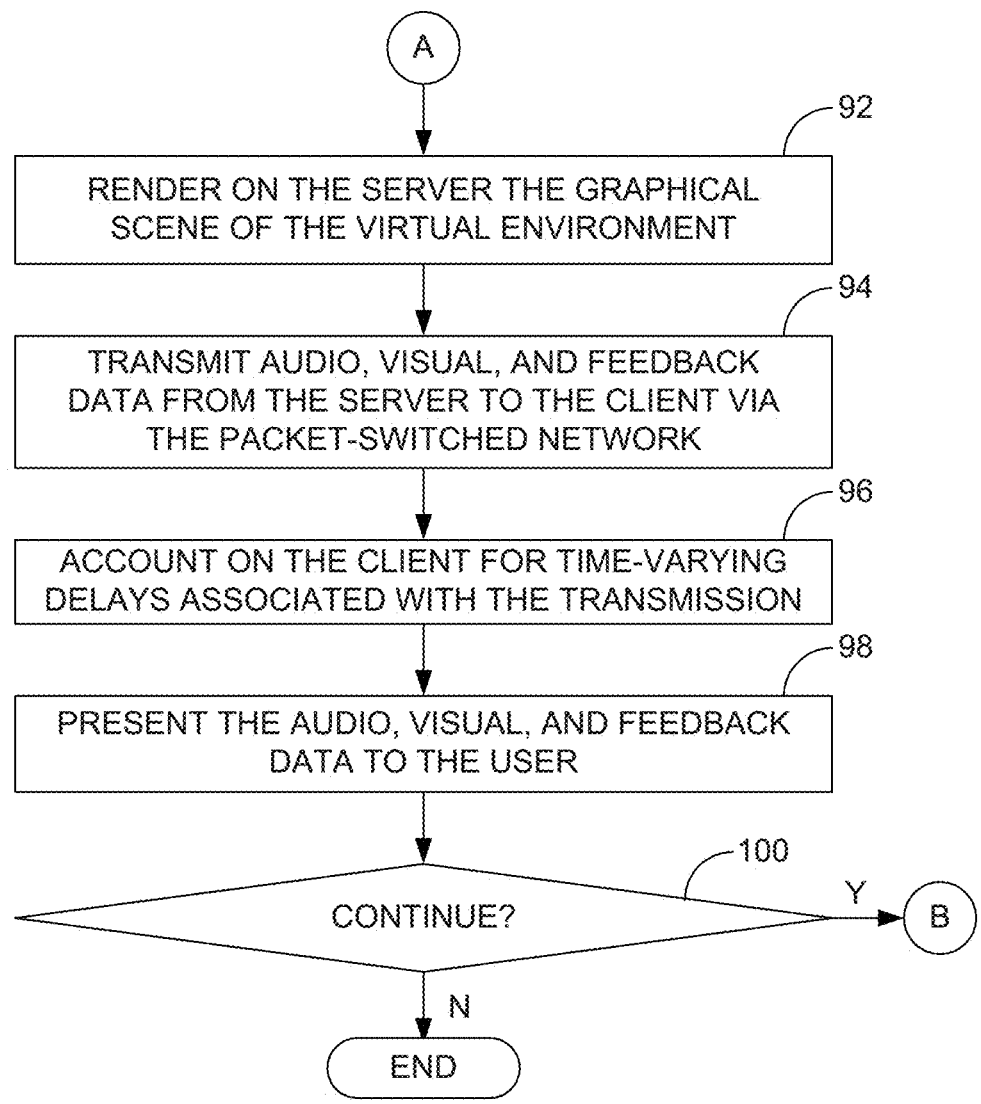

FIGS. 8A and 8B comprise a flow diagram of an example embodiment of a method for providing stable haptic feedback over a packet-switched network consistent with the discussions provided above. Beginning with block 80 of FIG. 8A, a user input is received from a haptic device. As mentioned above, the user can manipulate a component of the haptic device, such as a stylus or other component, and the direction and speed of the motion can be sensed by the haptic device and transmitted to the client computer, which can, for example, comprise a thin client or a mobile client.

Referring next to block 82, the user input data can be transmitted from the client computer ("client") to the server computer ("server") via a packet-switched network, such as the Internet. In some embodiments, the user input data is transmitted to the server using UDP. The data is transmitted and received as discrete packets of data that can experience time-varying delays in the packet-switched network. Because of this, the client and server may account for these delays, as indicated in block 84.

There are various ways for which the delays can be accounted. In some embodiments, the haptic communication and control system executing on both the client and the server implement a discrete time control algorithm with which the sample rates for the client and server are synchronized and a fixed-sized packet buffer is added to the communication blocks of the packets that is used to sort the packets based upon their time stamps and leveraged to implement an interpolator to ensure passivity when packets are lost. In some embodiments, lost packets are compensated for using a monotonically increasing sum of the wave variables coming out from the scattering operation. The summed value along with a time stamp is sent over the network and a complementary block, referred to as the subtractor, is used on the other side of the channel to subtract last received value from the currently received wave variable to obtain the current state. The time stamp that was added to each message can then be used to determine if any packets were lost during communication. If packets have been lost, additional samples can be injected into the buffer by the interpolator, each with a value the current value of the wave variable less the previously received value. In some embodiments, a buffering mechanism is also used that compresses extra messages and stretches signals when necessary by applying an exponential smoothing filter to the wave signal so that the shape and trend of the signal are maintained.

Once the user input data has been received by the server, the server can model the user's movement in the virtual environment, as indicated in block 86. For example, if the user manipulates a stylus or other component, the server can model the movement of this component. In some embodiments, the haptic feedback and control system on the server models the movements as a stochastic process. Through such modeling, the position of a cursor, which may represent an instrument or other tool that the user is controlling in the virtual environment, can be estimated, as indicated in block 88. In some embodiments, the orientation and position (i.e., pose) of the cursor can be estimated using a recursive Bayesian filtering technique. The cursor pose can be predicted based on current trajectory and information about the latest round trip time between client and server while the cursor is not in contact with the model, and the location of the cursor can be determined with an optimal j-step look-ahead Kalman predictor. After a collision has been registered between the cursor and the virtual model, optimal smoothing can be performed using the Kalman filter without prediction.

Referring next to block 90, the server can then determine what audio, visual, and tactile feedback to provide to the user. Once the visual feedback has been determined, the server can render the graphical scene of the virtual environment, as indicated in block 92. At this point, the server can transmit audio, visual, and tactile feedback data to the client via the packet-switched network, as indicated in block 94. In some embodiments, the graphical scene data can be transmitted as streaming compressed video images that can be rendered after decompression. With reference to block 96, the transmission of data from the server to the client can comprise the same measures that were taken for the transmission of data from the client to the server to account for time-varying delays from the packet-switched network.

Once the audio, visual, and tactile feedback data has been received by the client, the client can present this data to the user. In particular, any audio data can be presented to the user with speakers, the visual data can be presented to the user with a display device, and the tactile feedback data can be presented to the user with the haptic device, all in a synchronized manner so as to simulate what is happening in the virtual environment.

At this point, it can be determined whether or not the simulation is to continue, as indicated in block 104. If so, flow returns to block 80 of FIG. 8A and the above-described process is repeated. If not, flow for the session is terminated.

Experimentation

The control algorithms described above were implemented to build a prototype of the above-described system. The framework was designed to connect with remote servers through socket connections and was fully compliant with multiple operating systems. A NOVINT Falcon® haptic device was connected to a thin client running on the Windows® operating system while the server was a 64-bit Linux® machine with high performance hardware, including graphics processing units (GPUs). The system was tested by connecting to the server through the Internet as well as within a local area network. Testing within the local network was performed by simulating jitter and round trip delay using an echo server.

Figure 9A:
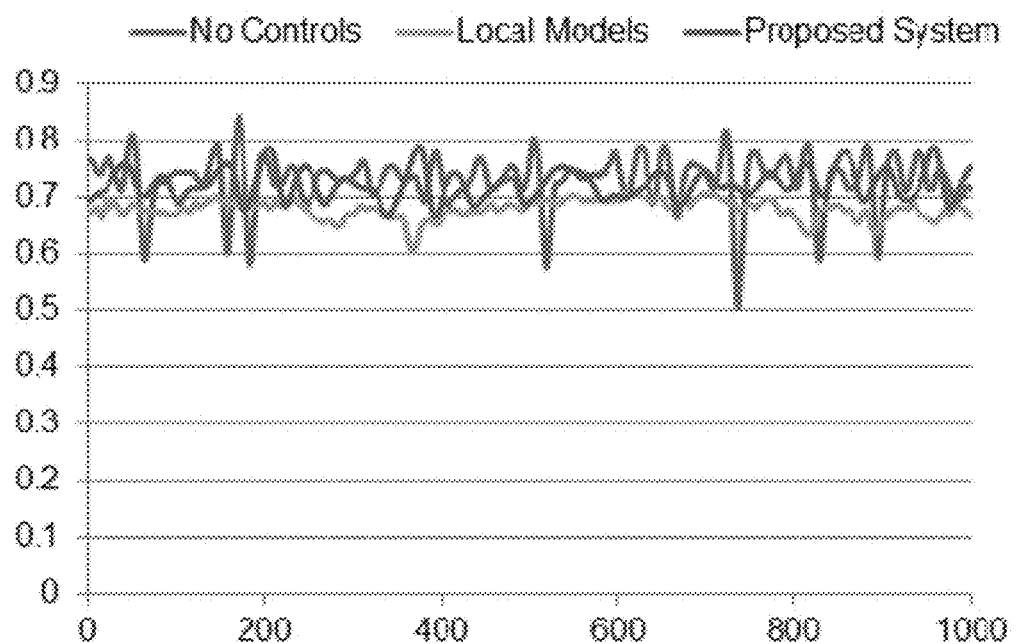
FIGS. 9A and 9B are graphs that compare position coherence when no controls are used, when local models are used, and when the disclosed system is used.
Figure 9B:
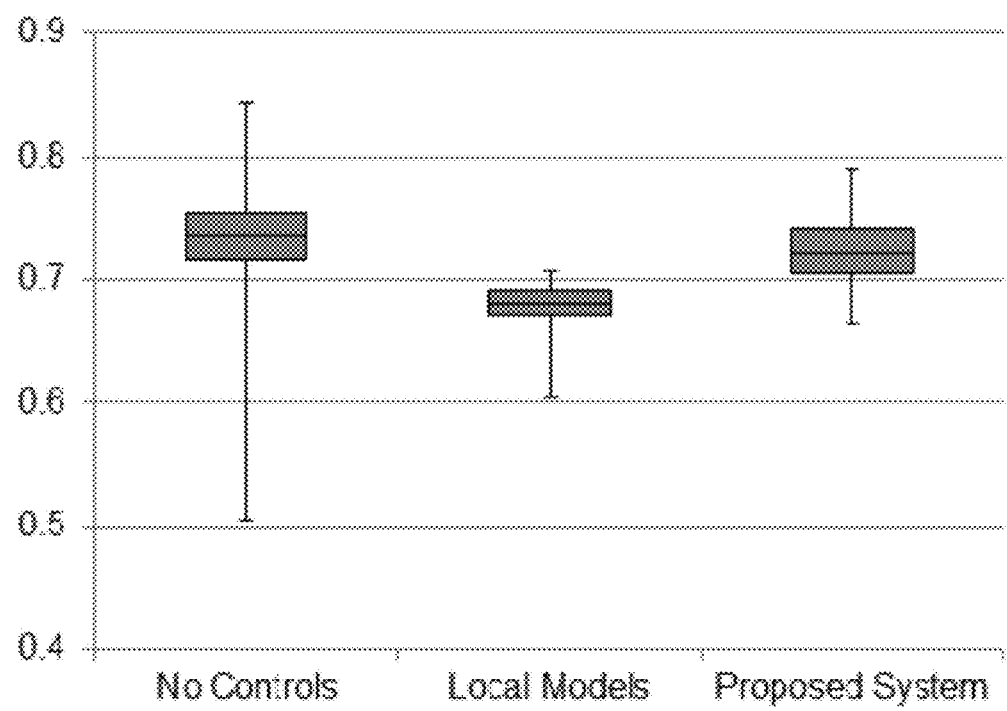

The system was tested with various round trip delays because it correlates with the maximum area that can be served with a given server. The largest round trip delay that was tested was approximately 100 ms when connecting a client in Tampa, Fla. to a server in Sunnyvale, Calif. The system performance was within an acceptable range. The graphs of FIGS. 9A and 9B show a comparative analysis of an interaction with a rigid wall when the haptic simulation is performed locally versus using a network-based system for executing the same task. The simulated round trip delay in this instance was around 78 ms. The efficacy of the algorithms is also demonstrated by comparing the interaction in the absence of any control systems.

FIG. 9A is a plot of the position of the cursor in the z direction while the user is haptically interacting with that face of an object. It is apparent that using raw data without any control systems leads to instabilities. The output with the control algorithm is far superior compared with the setup without the control system. The standard deviation in the uncontrolled case was approximately two times the standard deviation in the controlled case, as shown in FIG. 9B. A natural consequence of this reduction in variability with the proposed setup is a stable and transparent force feedback in the presence of random delays.

The invention claimed is:

1. A method for providing haptic feedback to a user over a packet-switched network, the method comprising:
   sensing movement of a haptic device by a user, the haptic device being configured to control a first virtual object within a virtual environment;
   transmitting data associated with the movement of the haptic device from a client computer to a remote server via the packet-switched network;
   the server modeling movement of the first virtual object in the virtual environment and estimating an orientation and a position of the first virtual object within the virtual environment;
   the server determining a type of tactile feedback to be provided to the user;
   the server transmitting the type of tactile feedback data to the client computer via the packet-switched network; and
   providing tactile feedback to the user with the haptic device.

2. The method of claim 1, wherein the haptic device controls a virtual dental or surgical instrument in the virtual environment.

3. The method of claim 1, wherein transmitting data associated with the movement of the haptic device from a client computer comprises transmitting the data to the server from a thin client or a mobile client.

4. The method of claim 1, wherein transmitting data associated with the movement of the haptic device via the packet-switched network comprises transmitting the data using a user datagram protocol (UDP).

5. The method of claim 1, wherein transmitting data associated with the movement of the haptic device via the packet-switched network comprises accounting for time-varying delays in the packet-switched network.

6. The method of claim 1, wherein modeling movement of the first virtual object in the virtual environment comprises modeling the movements as a stochastic process.

7. The method of claim 6, wherein estimating the orientation and the position of the first virtual object comprises estimating the orientation and the position using a recursive Bayesian filtering technique.

8. The method of claim 7, wherein estimating the orientation and the position of the first virtual object comprises determining the orientation and the position using an optimal j-step look-ahead Kalman predictor.

9. The method of claim 8, further comprising performing optimal smoothing using a Kalman filter after a contact has been registered between the first virtual object and a second virtual object in the virtual environment.

10. The method of claim 9, wherein determining tactile feedback to be provided to the user comprises determining the nature of the contact between the first and second virtual objects in the virtual environment.

11. A non-transitory computer-readable medium that stores a haptic communication and control system, the system comprising:
   logic configured to receive via a packet-switched network data associated with movement of a haptic device by a user;
   logic configured to model movement of a first virtual object within a virtual environment and to estimate an orientation and a position of the first virtual object within the virtual environment based upon the received data;
   logic configured to determine a type of tactile feedback to be provided to the user; and
   logic configured to transmit the type of tactile feedback data to a client computer via the packet-switched network.

12. The non-transitory computer-readable medium of claim 11, wherein the logic configured to receive data associated with movement of a haptic device comprises is configured to receive the using a user datagram protocol (UDP).

13. The non-transitory computer-readable medium of claim 11, wherein the logic configured to model movement of the first virtual object within the virtual environment and to estimate the orientation and the position of the first virtual object is configured to model the movements as a stochastic process.

14. The non-transitory computer-readable medium of claim 13, wherein the logic configured to model movement of the first virtual object within the virtual environment and to estimate the orientation and the position of the first virtual object is configured to estimate the orientation and the position using a recursive Bayesian filtering technique.

15. The non-transitory computer-readable medium of claim 14, wherein the logic configured to model movement of the first virtual object within the virtual environment and to estimate the orientation and the position is configured to determine the orientation and the position using an optimal j-step look-ahead Kalman predictor.

16. A system for providing haptic feedback to a user over a packet-switched network, the system comprising:
   a client computer;
   a haptic device associated with the client computer, the haptic device being configured to control a first virtual object within a virtual environment; and
   a remote server connected to the client computer via a packet-switched network, the server comprising a haptic communication and control system configured to:
      receive via the packet-switched network data associated with movement of the haptic device by a user,
      model movement of the first virtual object within the virtual environment and to estimate an orientation and a position of the first virtual object within the virtual environment based upon the received data,
      determine a type of tactile feedback to be provided to the user, and
      transmit the type of tactile feedback data to the client computer via the packet-switched network that can be used to control the haptic device to provide tactile feedback to the user.

17. The system of claim 16, wherein the client computer is a thin client or a mobile client.

18. The system of claim 16, wherein the haptic communication and control system of the server is configured to model the movements as a stochastic process.

19. The system of claim 18, wherein the haptic communication and control system of the server is configured to estimate the orientation and the position of the first virtual object using a recursive Bayesian filtering technique.

20. The system of claim 19, wherein the haptic communication and control system of the server is configured determine the orientation and the position of the first virtual object using an optimal j-step look-ahead Kalman predictor.

* * * * *